US012561343B2

(12) United States Patent
Kompaniets et al.

(10) Patent No.: US 12,561,343 B2
(45) **Date of Patent: \*Feb. 24, 2026**

(54) SYSTEM AND METHOD FOR STRUCTURING AND ACCESSING TENANT DATA IN A HIERARCHICAL MULTI-TENANT ENVIRONMENT

(71) Applicant: Acronis International GmbH, Schaffhausen (CH)

(72) Inventors: Ilya Kompaniets, Sofia (BG); Ivan Rid, Sofia (BG); Serguei Beloussov, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/808,324

(22) Filed: Aug. 19, 2024

(65) Prior Publication Data

US 2024/0419688 A1     Dec. 19, 2024

Related U.S. Application Data

(63) Continuation of application No. 17/301,277, filed on Mar. 30, 2021, now Pat. No. 12,111,847.

(51) Int. Cl.
*G06F 16/27* (2019.01)
*G06F 16/22* (2019.01)

(52) U.S. Cl.
CPC ........ *G06F 16/278* (2019.01); *G06F 16/2246* (2019.01)

(58) Field of Classification Search
CPC .......................... G06F 16/278; G06F 16/2246
See application file for complete search history.

(56) References Cited

U.S. PATENT DOCUMENTS

| | | | |
|---|---|---|---|
| 10,152,390 B1 | 12/2018 | Chepel et al. | |
| 10,616,338 B1 * | 4/2020 | Gupta ................. | H04L 67/1097 |
| 10,725,819 B2 | 7/2020 | Bykov et al. | |
| 12,111,847 B2 | 10/2024 | Kompaniets et al. | |
| 2013/0290464 A1 * | 10/2013 | Barrall ................... | G06F 15/167 |
| | | | 709/213 |
| 2016/0070771 A1 * | 3/2016 | Vermeulen ............ | G06F 11/202 |
| | | | 707/687 |
| 2016/0203174 A1 * | 7/2016 | Shahane ............. | G06F 16/2228 |
| | | | 707/803 |
| 2020/0117637 A1 * | 4/2020 | Roy ....................... | G06F 16/137 |
| 2021/0173710 A1 * | 6/2021 | Crossley ............. | G06F 9/45558 |

(Continued)

OTHER PUBLICATIONS

Maenhaut et al.: "A dynamic Tenant-Defined Storage system for efficient resource management in cloud applications", Journal of Network and Computer Applications 93 (2017) 182-196 (Year: 2017).*

(Continued)

*Primary Examiner* — Kuen S Lu
(74) *Attorney, Agent, or Firm* — ESPE Legal Consultancy FZ-LLC

(57) ABSTRACT

In a multi-tenant hierarchical data storage system, tenant nodes are organized into trees and subtrees including virtual shards and with tenant data on single shards. The system is configured to allow scalable parallel access by a plurality of tenant-users.

20 Claims, 10 Drawing Sheets

(56)                    References Cited

U.S. PATENT DOCUMENTS

2021/0192281 A1\*   6/2021  Deshpande ............. G06F 16/22

OTHER PUBLICATIONS

Maenhaut et al., "A Dynamic Tenant-Defined Storage System for Efficient Resource Management in Cloud Applications", Journal of Network and Computer Applications 93 (2017) 182-196.

Application and File History for U.S. Appl. No. 17/301,277, filed Mar. 30, 2021 (now U.S. Pat. No. 12,111,847 issued Oct. 8, 2024), inventors Kompaniets et al.

European Search Report for EP22020087 dated Jul. 28, 2022.

\* cited by examiner

SYSTEM AND METHOD FOR STRUCTURING AND ACCESSING TENANT DATA IN A HIERARCHICAL MULTI-TENANT ENVIRONMENT

CLAIM TO PRIORITY

The application is a continuation of U.S. patent application Ser. No. 17/301,277 filed Mar. 30, 2021, now U.S. Publication No. 2022/0318074 published on Oct. 6, 2022, which is incorporated by reference in its entirety.

TECHNICAL FIELD

The invention pertains to data storage and access in computer systems involving a multi-tenant environment.

BACKGROUND

Increasing demand for data storage creates problems of scale. Maintaining huge amounts of high-consistent data within a single storage solution can cause problems for system performance, operability, and security isolation.

Vertical scaling means adding CPU, memory, or disk bandwidth. This ensures linear productivity growth but at some point the method stops working.

Horizontal scaling is where data is split into parts and decomposed into different storages. Splitting into parts is partitioning. Decomposition is sharding. Storages can be decomposed on one disk or multiple disks.

Hierarchical multi-tenant systems present unique challenges. The distribution of data associated with different tenants among different databases in hierarchical multi-tenant environments create access issues related to how data is stored within the trees and subtrees that make up the system.

Without subtrees, scaling works by selecting a separate non-overlapping resource pool for each tenant or group of tenants. With child subtrees, however, there is no clear way to organize productive access to the child data.

In multi-tenant systems with thousands of tenants, parallel data requests must be processed quickly. Tenant-users work with their data by loading and searching, counting statistics, creating reports or requesting data with complex filtering parameters. This work can create a queue with millions of parallel data requests. If the storage system processes these requests slowly, the tenant-users will experience service degradation. And when multiple tenants' data is stored in a common shard then one user (one tenant) can overload the system and it will affect other tenant experiences.

SUMMARY

This invention solves the problem of sharding storage data in a hierarchical multi-tenant environment. In this environment, unique tenant data is stored on shards. The tenant tree is segmented with linked components and a database shard is allocated so that tenant data is kept on separate shards.

Hierarchical tables typically include a limited degree of nesting. An object of the invention is to apply optimized sharding techniques to hierarchical structures and to increase performance of parallel processing requests.

Sharding is optimized so that access areas of individual tenants is covered by the minimum number of shards. The segmentation algorithm includes the limitation that only tenant data may be on one shard, connected by hierarchical topology.

In an embodiment, the hierarchical multi-tenant storage system comprises: a computer-readable storage medium configurable into shards; a plurality of tenant nodes stored on the storage medium; a plurality of child nodes accessible from the tenant nodes; a plurality of shards on which tenant nodes and child nodes are located; and at least one virtual shard for storing child nodes.

In an embodiment, tenant data is allocated in trees giving access to child data and further comprising migrated tenant data.

In another embodiment, the hierarchical multi-tenant storage system comprises a rebuilt tenant access tree.

In another embodiment, at least one tenant's data is stored on a single shard.

In an alternative embodiment, parallel access requests to tenant nodes are processed in a hierarchical multi-tenant distributed data storage environment by partitioning data storage by shards, wherein each shard contains the data of a single tenant; creating a hierarchical data access structure equal to a multi-tenant structure of a storage service, wherein each level of the hierarchical data access structure corresponds to an access level to all subsequent levels of the hierarchy; wherein the lower level of the hierarchical data access structure corresponds to an access level to a single shard; and processing parallel data access requests, wherein each data access request is routed to a target shard in accordance to a hierarchical structure, and wherein data requests of a first tenant does not load shards of another tenant.

In alternative embodiment, parallel access to tenant nodes in a hierarchical multi-tenant data storage environment is configured, wherein tenant nodes are stored on virtual shards, by calculating a storage allocation configuration for tenant nodes using a bin-packing algorithm; virtualizing at least one shard for storage of a tenant node consistent with the calculated allocation configuration; and accepting simultaneous processing requests to access one or more tenant nodes on a virtual shard.

DETAILED DESCRIPTION

Sharding in Multi-Tenant Hierarchical Systems

Multi-tenancy is where independent service clients, the tenants, share a single pool of resources. Hierarchy means that system tenants are organized in a tree-like arrangement, where each tenant has access to its own data and data of its child subtrees.

Performance requirements refer to processing times, response times to requests under parallel load conditions, and how many requests the system can handle. Performance is closely related to scalability. Scalability is the ability of a system to increase performance in proportion to additional resources.

Vertical scaling is implemented through adding or removing computing resources from the system. Examples of resources include CPU size, memory size, or network bandwidth. No changes are required in application programs and the efficiency can be linear in relation to the amount of added resources.

Horizontal scaling is implemented through adding or removing additional instances of the application programs. Typically, each new copy is allocated resources but sometimes the original shared resource pool is enough.

In cloud systems, a system's ability to scale is referred to as its elasticity. Data-heavy cloud applications can become bottlenecked by data stores. Elasticity of data warehouses may be increased by partitioning and sharding.

Partitioning and sharding are processes that separate data into several parts. Partitioned data is located on one copy of the storage. Sharded data is located on different copies of the storage. Data can be separated by range keys in tables, by hashes of the keys, by timestamps, by geographic data, and by columns.

Figure 1:
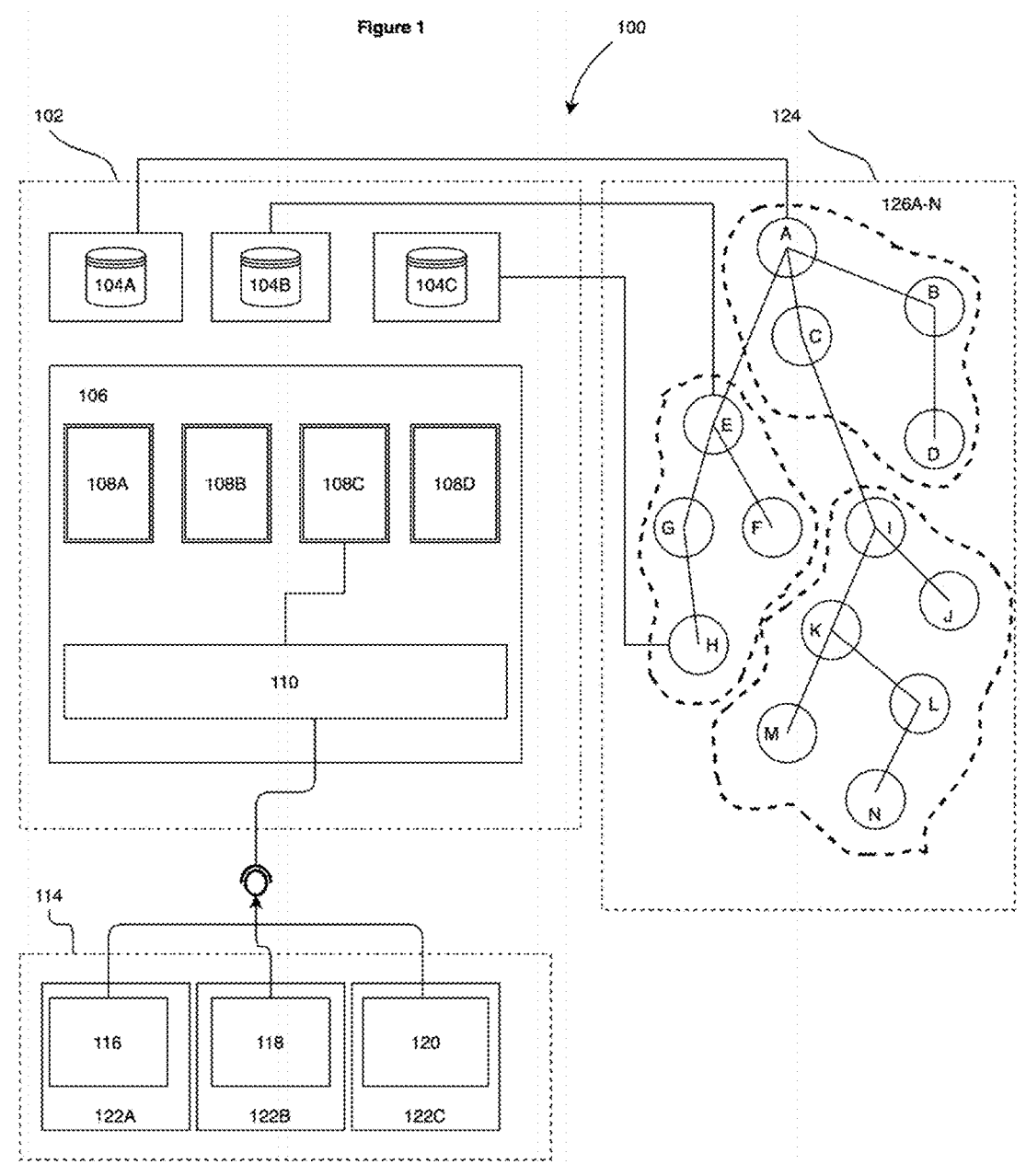
FIG. 1 shows an implementation of data sharding in a hierarchical multi-tenant system.

FIG. 1 shows hierarchical multi-tenant system 100 in a cloud-based environment. A cloud instance 102 includes databases 104A, 104B, and 104C and platform core 106. Platform core 106 comprises task manager instances 108A, 108B, 108C, and 108D and API gateway 110. Task manager instances 108A, 108B, 108C, and 108D communicate with databases 104A-C. API gateway 110 communicates with customer 114 by way of REST API 122 and agent 116 on operating system 122A, API client 118 on operating system 122B, and user interface 120 on operating system 122C. Operating systems 122A-C may be any operating system.

Databases 104A, 104B, and 104C are divided among tenants 126A-N. Tenants 126A-D correspond to database 104A, tenants 126E-H correspond to database 104B, and tenants 126I-N correspond to database 104C.

When sharding data in a multi-tenant system, data may be shared between shards either by fission or fusion.

Figure 2:
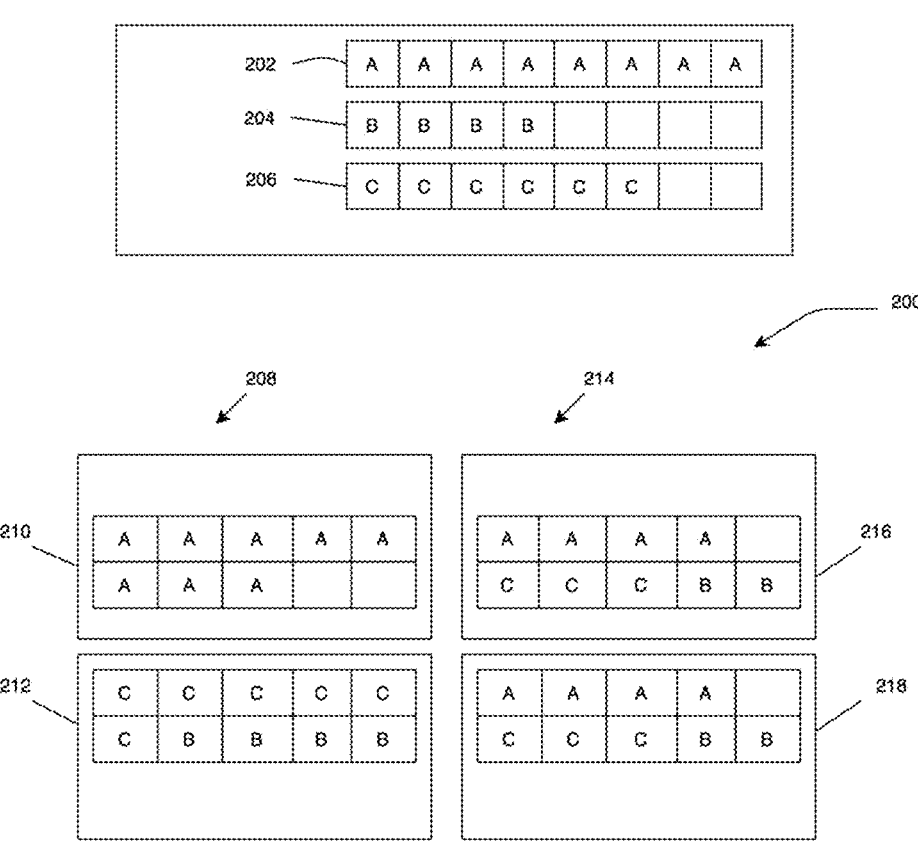
FIG. 2 shows examples of data fusion and data fission.

FIG. 2 shows two possible data allocation methods 200 for tenant A data 202, tenant B data 204, and tenant C data 206. Data fusion 208 appears in instances 210 and 212. Data fission 214 appears in instances 216 and 218.

Data fusion combines data into semantic groups. Each group is located in only one repository. This arrangement achieves high productivity for group operations when required because of high data consistency among these groups. Data fission separates data from semantic groups evenly across different storages and performs group operations in parallel.

Data fusion is preferably used to allocate storage because it offers better tenant isolation and reduces performance costs from aggregated requests.

Insulation of tenants from each other is an important aspect of the safety and performance of multi-tenant systems. Storage should act as if it is dedicated to each tenant. If each tenant's data is stored only on one shard, then any performance slowdown caused by unusual loads will affect only shard neighbors. If each tenant's data is stored on multiple shards, unusual loads will affect the performance of the entire application. When shards are located at a distance from each other, processing times could become very long for a tenant whose shards are far apart.

A tenant or tenant node in this context may refer to an application, a virtual machine, a container, a virtual server, a database, or other processes that can be hosted.

In a multi-tenant system, the load power from each tenant is proportional to the amount of data in that tenant's database. For large numbers of tenants, it should be expected that the ratio of load power to the amount of data will be a normal distribution. The differences between tenants will be essentially the intensity of how they use the service. If the data of all tenants is divided by the number of shards so the shards are generally uniform, then the parallel loads on these shards will also be uniform.

Tenant data is distributed relatively evenly over the minimum number of shards of limited size and allows for rebalancing. The system determines which data to migrate and how to implement the migration consistent with this distribution scheme. Bin packing algorithms are the preferred tools to achieve optimal distribution.

In this case, the focus is on applications where each client-tenant works with its own virtual application instance and has access to application instances of its children. Tenant nodes contain data and also may link to other nodes.

Figure 3:
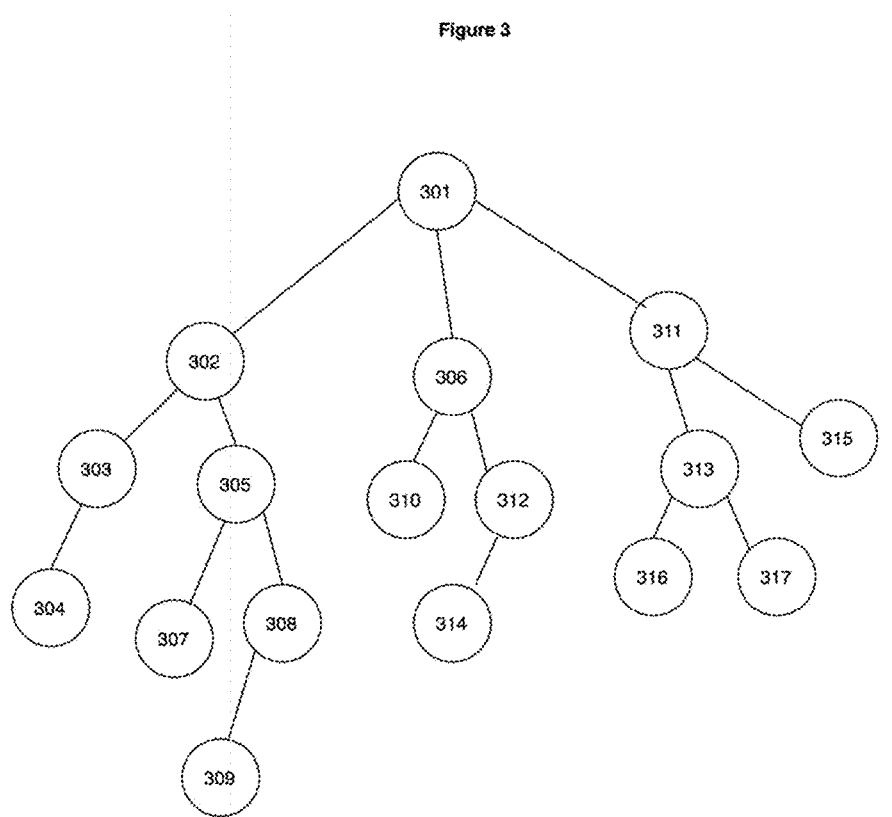
FIG. 3 shows a hierarchical tenant system with linear clustering.

FIG. 3 shows a hierarchical system 300 with tenant nodes 305, 306, and 307. Tenant node 305 has access to data in its own node 305 and downstream nodes 307, 308, and 309. Tenant node 306 has access to nodes 306, 310, 312, and 314. Tenant 313 has access to nodes 313, 316, and 317.

When data is stored in the same database, there is a column storing each tenant identifier. For each line there is an explicit indication of who owns the stored data. For quick access, each tenant's storage needs to be readily available.

Figure 4:
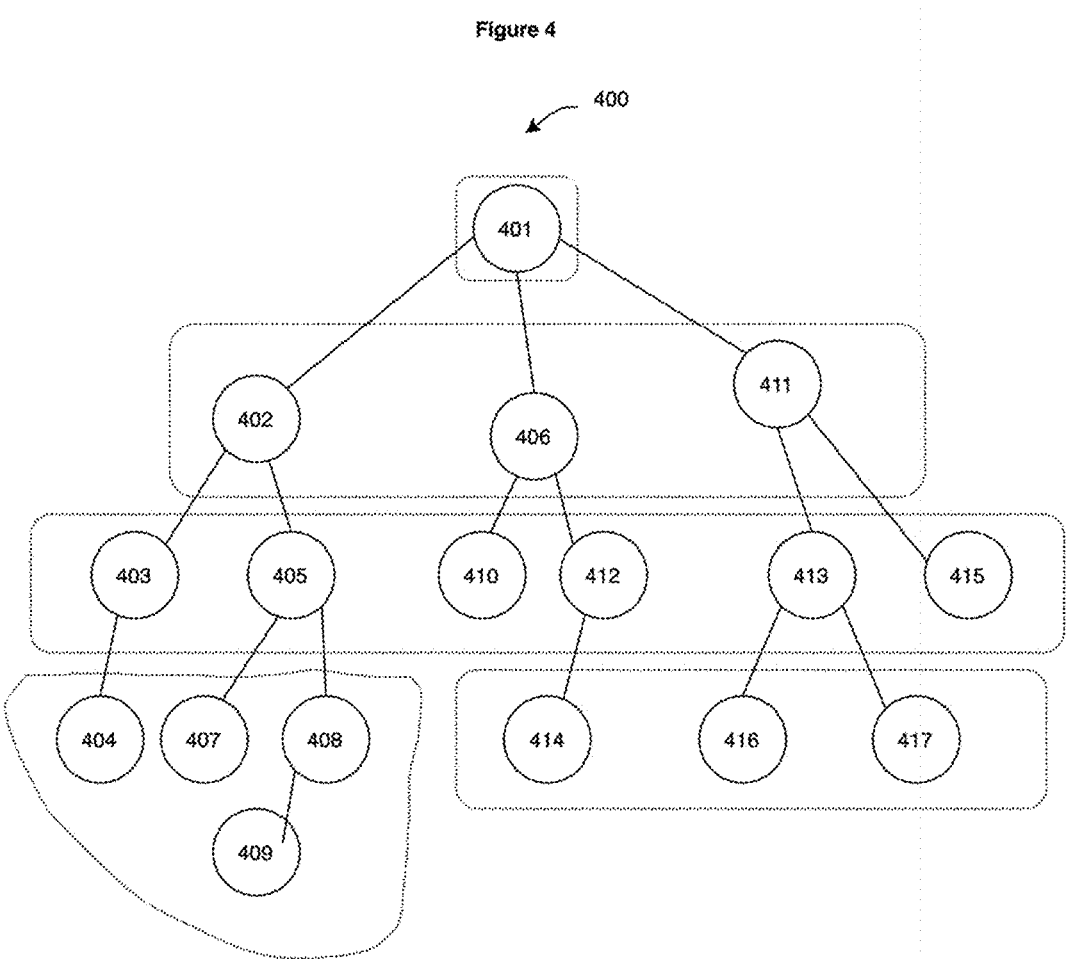
FIG. 4 shows a hierarchical tenant system with linear data allocations.

FIG. 4 shows hierarchical multi-tenant system 400 with tenants 401-417. In system 400, tenant data can be divided evenly among the allocated shards and organized so that requests from clients go to the shards that have tenant data and corresponding filters are applied. Performance problems arise when there is a high level of data scattering among the shards. Access areas far from the root tenants can include tenant data in a large number of shards. And performance can drop as the number of shards increases.

Figure 5:
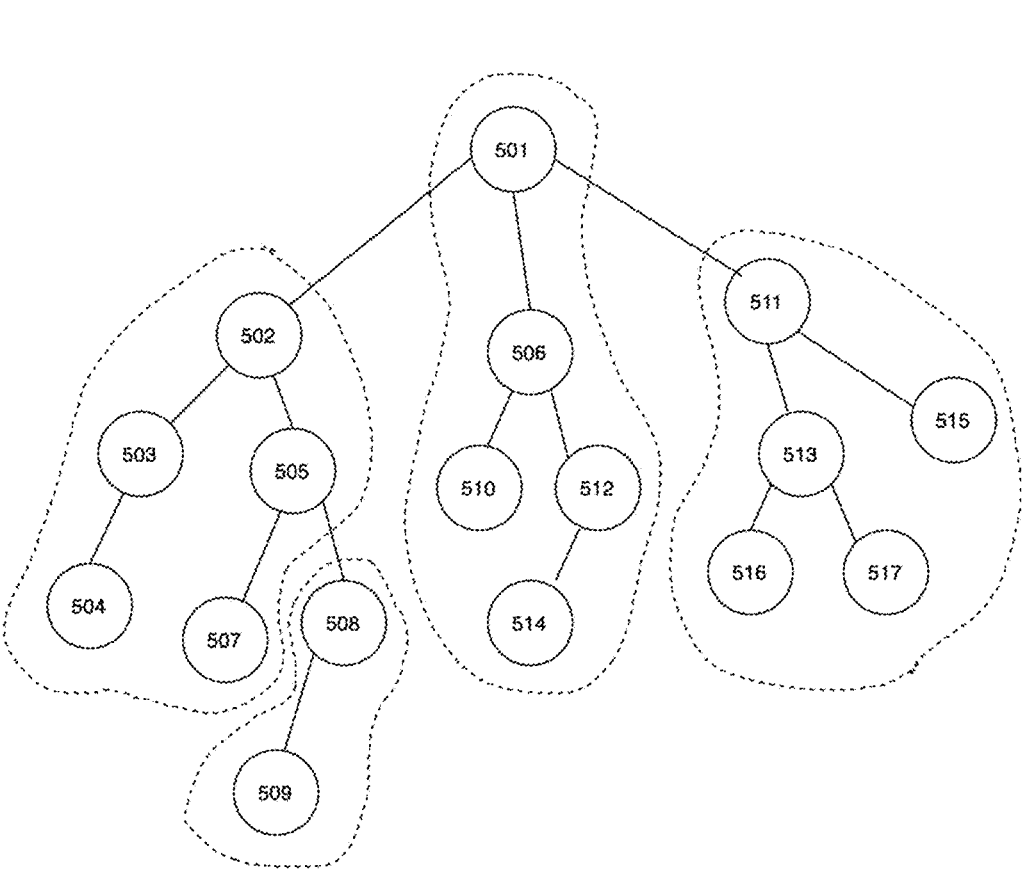
FIG. 5 shows a hierarchical tenant system with a clustering of tenants.

FIG. 5 shows hierarchical multi-tenant system 500 where tenants 501-517 have been clustered to avoid data scattering.

Figure 6:
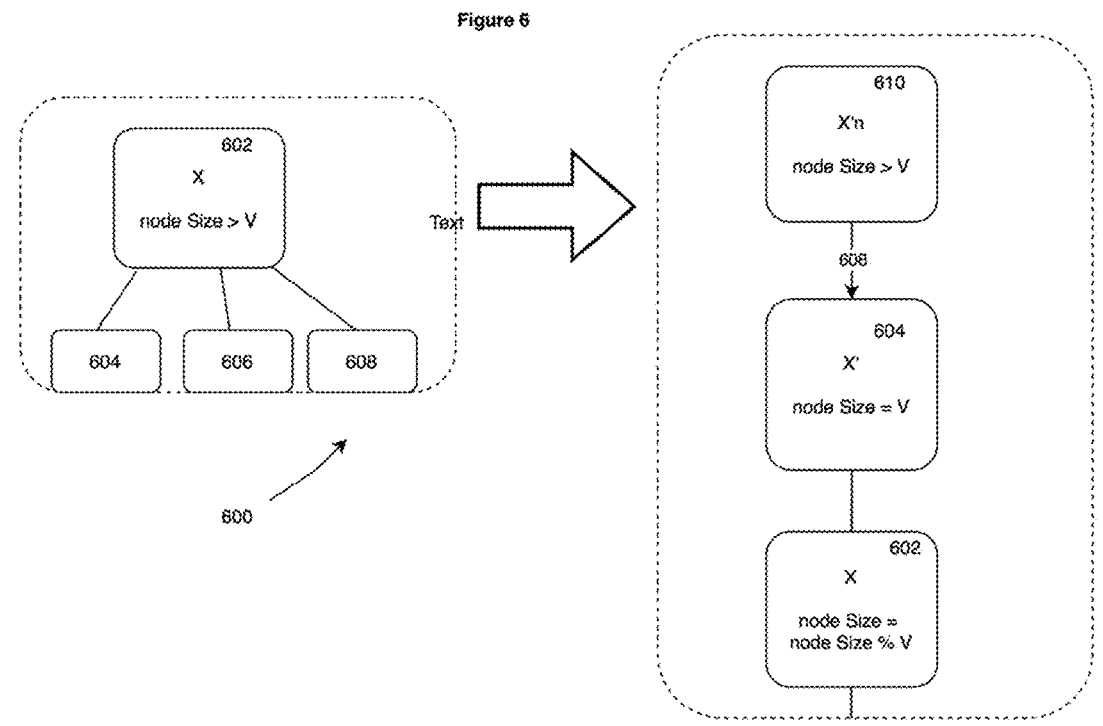
FIG. 6 shows clustering of large nodes within a tenant tree.

Preferably, all nodes fit within the allowed container size before applying optimization methods. When there are nodes larger than the allowed container size V, the tenant tree is preferably modified before optimization. FIG. 6 shows an example of node splitting 600 where a large node 602 with nodesize>V on a tenant tree with nodes 604, 606, and 608. A new tenant tree is preferably created by splitting node 602 into as many nodes 610, 612, as necessary and updating the original large node 602 so that its size is now a fraction of V.

Figure 7:
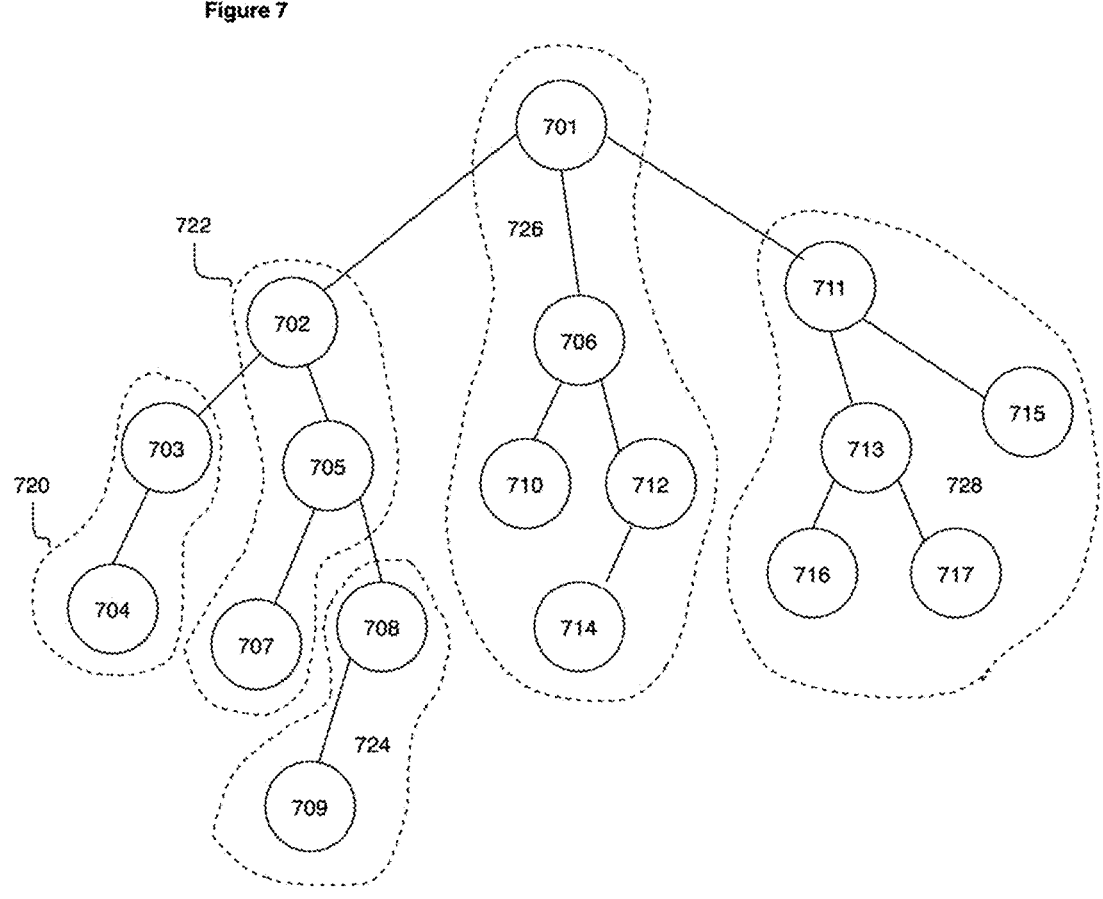
FIG. 7 shows a clustering of a tenant tree into connected components.

Tenant nodes have access to shards containing subtree nodes. FIG. 7 shows a hierarchical tenant shard tree 700 comprising tenant nodes 701-717 divided among shards 720, 722, 724, 726, and 728. FIG. 7 illustrates that access trees are not always subtrees of the general shard tree. For example, in FIG. 7 shard 722 which includes root node 702 has two children, shard 720 with root 703 and shard 724 with root 708. Tree access tenant 705 has only two elements: shard 722 with root node 702 and child shard 724 with root node 708. As shown in FIG. 7, not all children of the root nodes of shard trees can be children of the root nodes of access trees.

Algorithms for packing containers in conjunction with two additional parameters can be used for support for reallocations. Whenever reuse occurs or underutilization of any container, an allocation algorithm can be applied to the whole tree and based on the results, calculate migration. However, the algorithms completely ignore the previous splitting into containers, so migrations can be very big.

Figure 8:
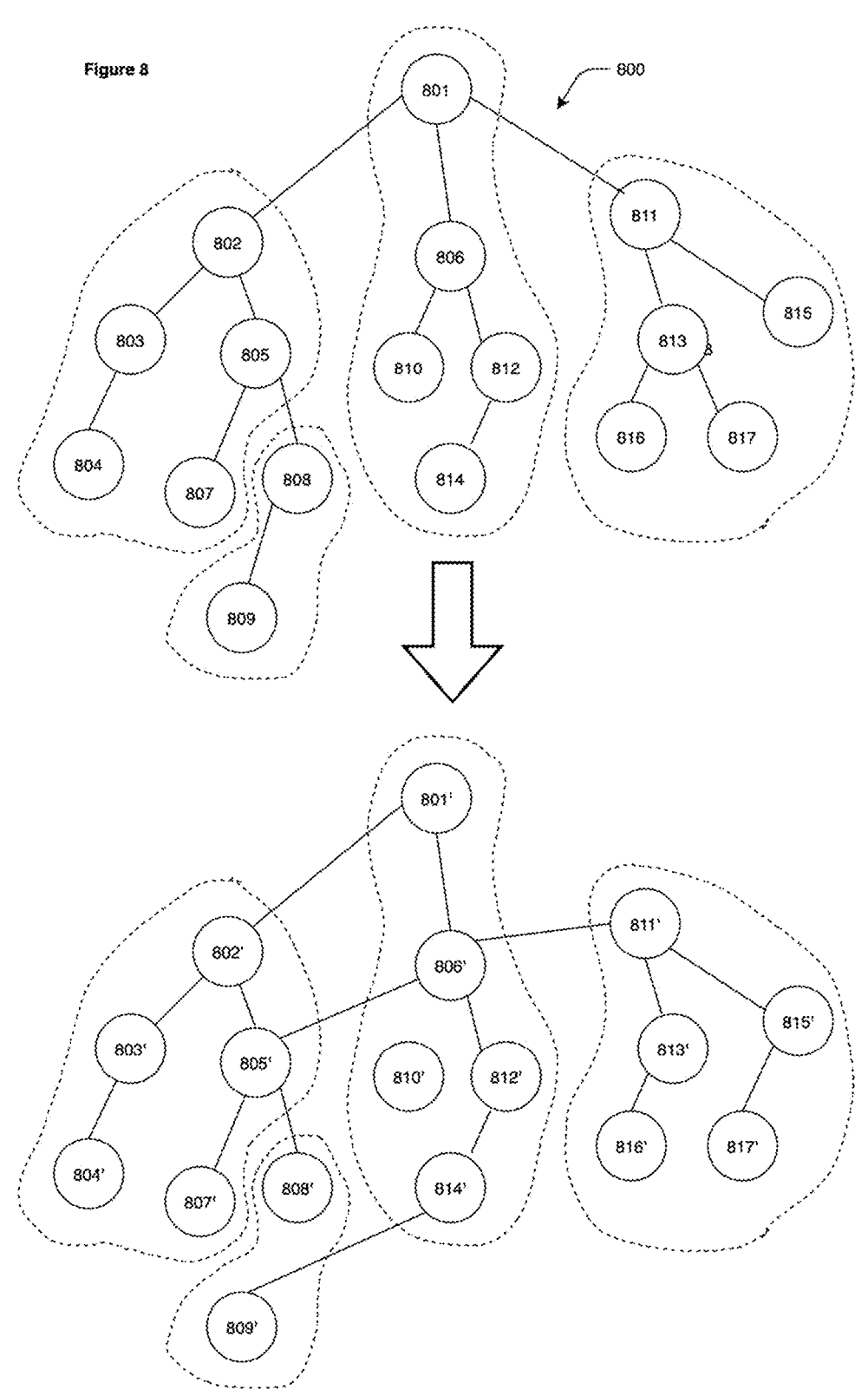
FIG. 8 shows a rebuilt shard tree with multiple tenants.

FIG. 8 shows a rebuilt shard tree 800 with tenant nodes 801-817 and showing four possible scenarios for tenant movement by hierarchy. In FIG. 8, nodes 801'-817' represent the post-migration positions of nodes 801-817 on shards 820, 822, 824, and 826.

In the first scenario, the non-root tenant 817 moves within the original segment to 817'. This movement can be implemented with known partitioning methods and clients will not notice any substitution.

In the second scenario, the root tenant 811 becomes 811'. In this case, the shard tree needs to be rebuilt for the system to perform correctly.

In the third scenario a non-root tenant 809 becomes 809' and moves to another segment, where the access tree for this tenant has one element. In this case, there are three options. The data could be migrated to a new shard with a new segment. Alternatively, a new shard could be allocated and data migrated there. Or the data could be kept in use on the old shard.

For the first two options, algorithms are used to determine whether it makes sense to move the data for this tenant to a separate shard. If the data is moved to a separate shard then the shard tree needs to be updated.

The third option requires implementing virtual shards. Virtual shards also define the tree shards. Only a tenant's own virtual shard and some other virtual shards can be on the same physical shard. Virtual shards are obtained by dividing the segments that form physical shards. In FIG. 8, there will be two virtual shards with roots 808' and 809', located on the same shard with root 808. This can also be viewed as partitions located on one physical storage.

Although the third migration scenario is harder to implement, it will allow for seamless movement of tenants.

In the fourth scenario, a non-root tenant 815 moves to another segment 815', where the access tree for this tenant has more than one element. This scenario is a more general case of the third scenario. The shard tree must be rebuilt because data from the original shard must be accessible as well as data from child shards.

Algorithms are chosen that allow for changing the arrangement of tenants in a tree and giving clients access to their data.

One approach would be to build the tenant tree after the fact by running data migration between physical storages.

Another approach would be to incorporate tree rebuilding into the process and carry out the migration along with tree rebuilding.

Yet another approach would be to introduce a virtual shard tree with a correspondence between them and physical shards and carry out real migrations independently of rebuilding the tenant tree.

The first approach can be used if the transfer must be as fast as possible. Hot data can be migrated first and then the cold data. This approach has the drawback that the client will not see its data for some time.

If the migration does not need to be instant but full consistency of data after transfer is important, then the second approach can be used. First a separate storage is allocated if necessary. After that follows a hot migration of all data available to the tenant from its current shard to the target data store. During migration the shard tree is rebuilt if a new shard is added and then logically ends the transfer. At this point data on the old storage may be deleted. Data on the old storage can be deleted because it cannot be seen by the tenant anyway at this point due to access restrictions. Users will not notice any side effects associated with loss of data consistency, but users will have to wait for the operation to finish.

Figure 9:
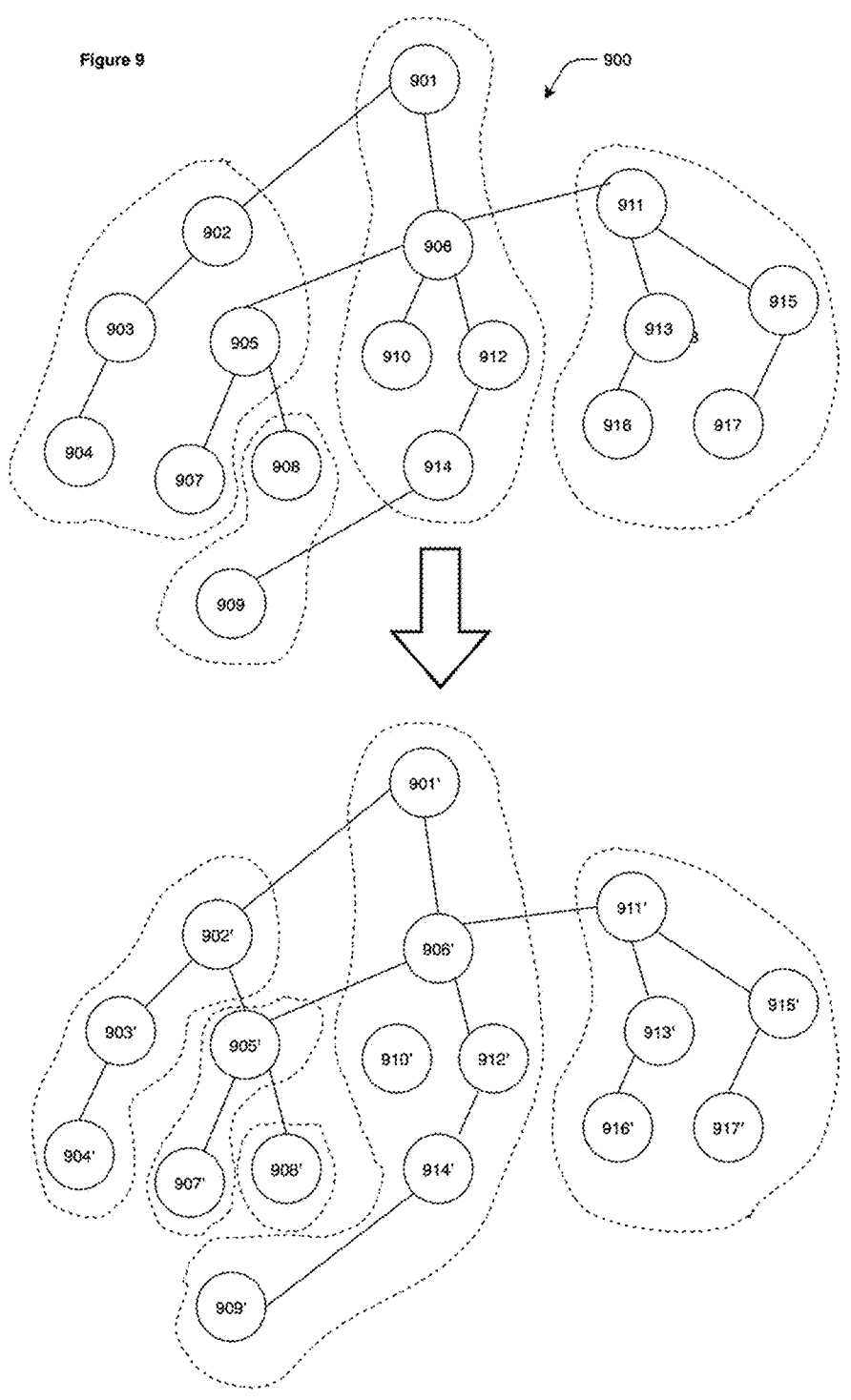
FIG. 9 shows a rebuilt shard tree in accordance with tenant movement.

FIG. 9 shows a migration with a rebuilt shard tree with new shards added. In FIG. 9, nodes 901'-917' represent the post-migration positions of nodes 901-917. The tree comprising shards 920, 922, 924, and 926 is rebuilt as new shards 928, 930, 932, 934, and original shard 924.

Figure 10:
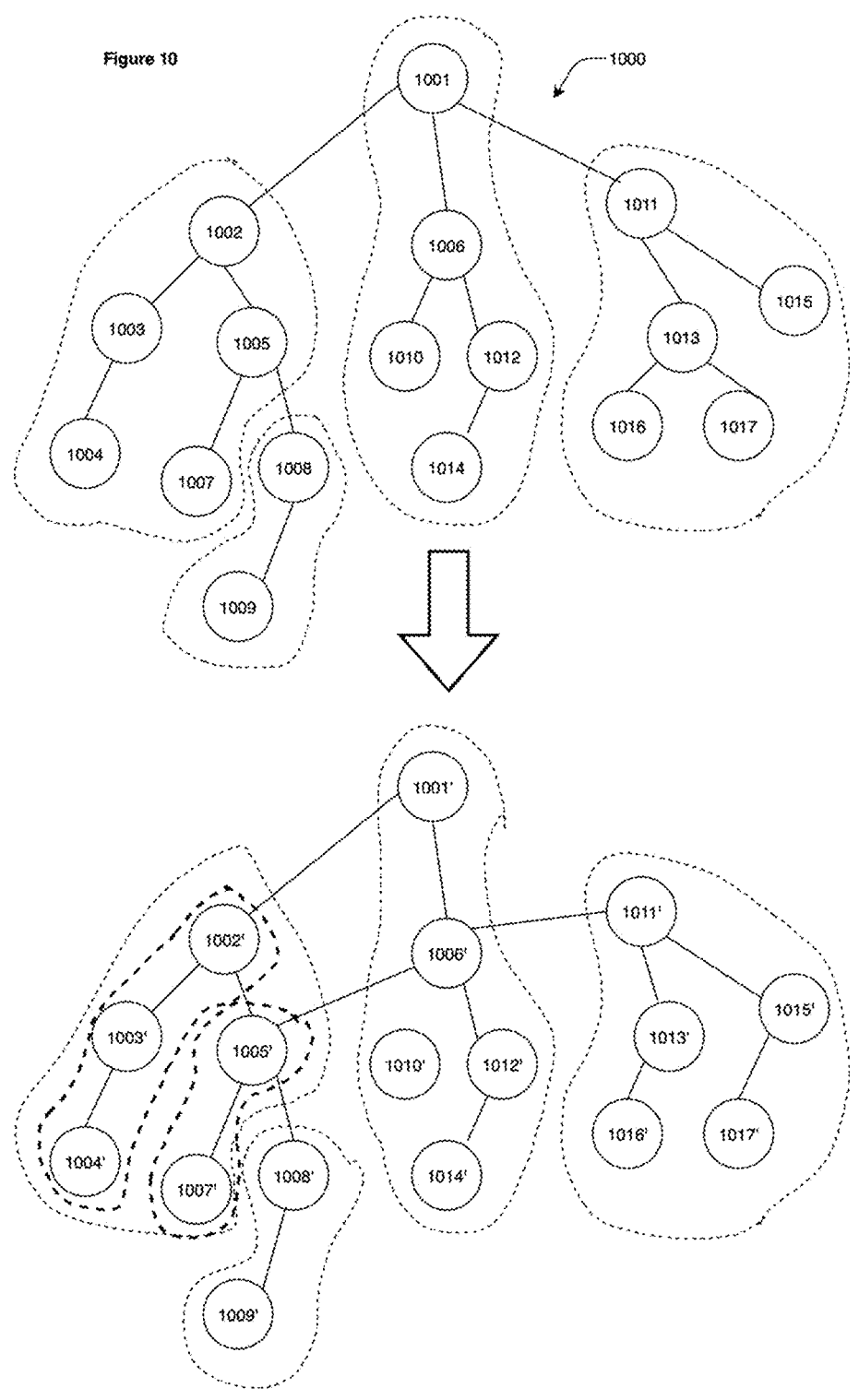
FIG. 10 shows an allocation of virtual shards on a physical shard.

The third approach with virtual shards is shown in FIG. 10. In FIG. 10, nodes 1001'-1017' represent the post-migration positions of nodes 1001-1017 on shards 1020, 1022, 1024, and 1026. This approach relies on a separate physical shard tree and a separate virtual shard tree. First, a virtual shard is allocated for the original tenant data. At the same time, the virtual shard tree is rebuilt and the tenant transfer operation is logically completed. Necessary migrations are performed asynchronously to restore a bijective mapping of virtual shards to physical shards.

This process will appear seamless to the user. Transfer of the tenant occurs instantly and without loss of data consistency.

Hierarchical packing into containers presents an NP-hard problem. The object is to fit items of predefined shape into a finite number of containers so that the fewest number of containers is used. The use of exact algorithms is only possible for small dimensions. Polynomial algorithms are used as heuristic approximations. These algorithms may be either online or offline, depending on whether the size of the objects is known. Online methods get information about objects and pack them on the fly. Offline methods solve the packing problem with full knowledge of the size of the objects. Preferably offline methods are used because the size of the objects is known.

Simple polynomial offline packing algorithms are Best Fit Decreasing (BFD) and First Fit Decreasing (FFD).

In actual systems, the distribution of weights and nodes in the tenant tree may change over time and the first partition may become ineffective. To maintain uniform distribution across shards, repositories eventually require rebalancing.

If the entire subtree can be placed in a single container, then the Hierarchical First Fit Decreasing (HFFD) algorithm yields the same results as a regular FFD. If the subtree does not fit into the whole container, then all child subtrees are sorted in descending order by their tree size together with the root note by its node size.

The Hierarchical Greedy Decreasing (HGD) algorithm places subtrees in containers differently. The subtree is placed in a new container which is then added to the list of containers. The HGD algorithm splits the tree into more containers than HFFD and thus minimizes the number and size of migrations.

The algorithms discussed work well with nodes of node size V but there may be trees with nodes larger than the allowed container size. In this case the tree must be modified before applying algorithms. An example is the node splitting method shown in FIG. 6 and described above.

Hierarchical bin packing algorithms are optimized for a dynamic environment by running the algorithm only for tree segments from overloaded or underloaded containers. Preferably a list is generated of nodes contained in overloaded or underloaded containers. The list is filtered by removing all over or under loaded containers. Algorithms can then be applied. This dynamic extension can be applied to all algorithms for packing containers, and we will call dynamic variants of the dHFFD (dynamic Hierarchical First first Decreasing) and dHGD (dynamic Hierarchical Greedy Decreasing) algorithms.

For most real-world applications, dHFFD is the more suitable algorithm because it reduces operating costs by minimizing the number of containers. If performance requirements outweigh operating costs, then dHGD is preferable because it reduces the number of migrations by increasing the number of allocated storages.

This system and method can be applied to other storage systems, such as databases, filestorages where similar scaling issues are presented.

The invention claimed is:

1. A hierarchical multi-tenant storage system comprising:
a computer-readable storage medium storing a first hierarchical shard tree including:
a first shard having a first tenant node and a second tenant node, wherein the second node is downstream of the first tenant node, and
a second shard having a third tenant node and a fourth tenant node, wherein the third tenant node is downstream of the first tenant node and the fourth tenant node is downstream of the third tenant node; and
a platform configured to:
determine the third tenant node is to be migrated downstream of the second tenant node and that the migration of the third tenant node would cause a data inconsistency within the first hierarchical shard tree, the data inconsistency defined by first data stored on the third tenant node or the fourth tenant node before migration and second data to be reproduced from the first data, such that after migration the first data would be different than the second data;
allocate, to avoid the data inconsistency, storage for a second hierarchical shard tree on the computer-readable storage medium, and
build the second hierarchical shard tree based on the first hierarchical shard tree, wherein the second hierarchical shard tree has the third tenant node downstream of the second tenant node, wherein access to the third tenant node is allowed after the second hierarchical shard tree is built and all operations to migrate the third tenant node are finished.

2. The hierarchical multi-tenant storage system of claim 1, wherein the platform is configured to build the second hierarchical shard tree by moving the fourth tenant node within the second shard.

3. The hierarchical multi-tenant storage system of claim 1, wherein the platform is configured to build the second hierarchical shard tree by moving the fourth tenant node from the second shard to the first shard.

4. The hierarchical multi-tenant storage system of claim 1, wherein the platform is further configured to build the second hierarchical shard tree by moving the third tenant node from the second shard to the first shard.

5. The hierarchical multi-tenant storage system of claim 1, wherein the platform is further configured to build the second hierarchical shard tree by further dividing physical segments of the second shard into a plurality of virtual shards and allocating the third tenant node data to at least one of the plurality of virtual shards.

6. The hierarchical multi-tenant storage system of claim 1, wherein the platform is further configured to build the second hierarchical shard tree by moving the fourth tenant node from the second shard to a third shard, wherein the fourth tenant node is downstream from more than one node.

7. The hierarchical multi-tenant storage system of claim 1, wherein the data inconsistency is not full consistency.

8. The hierarchical multi-tenant storage system of claim 1, wherein the platform is further configured to build the second hierarchical shard tree by migrating hot data of the third tenant node before migrating cold data of the third tenant node.

9. A method of migrating hierarchical multi-tenant storage, the method comprising:
providing a computer-readable storage medium storing a first hierarchical shard tree including:
a first shard having a first tenant node and a second tenant node, wherein the second node is downstream of the first tenant node, and
a second shard having a third tenant node and a fourth tenant node, wherein the third tenant node is downstream of the first tenant node and the fourth tenant node is downstream of the third tenant node;
determining the third tenant node is to be migrated downstream of the second tenant node and that the migration of the third tenant node would cause a data inconsistency within the first hierarchical shard tree, the data inconsistency defined by first data stored on the third tenant node or the fourth tenant node before migration and second data to be reproduced from the first data, such that after migration the first data would be different than the second data;
allocating to avoid the data inconsistency, storage for a second hierarchical shard tree on the computer-readable storage medium; and
building the second hierarchical shard tree based on the first hierarchical shard tree, wherein the second hierarchical shard tree has the third tenant node downstream of the second tenant node, wherein access to the third tenant node is allowed after the second hierarchical shard tree is built and all operations to migrate the third tenant node are finished.

10. The method of migrating hierarchical multi-tenant storage of claim 9, wherein building the second hierarchical shard tree further comprises moving the fourth tenant node within the second shard.

11. The method of migrating hierarchical multi-tenant storage of claim 9, wherein building the second hierarchical shard tree further comprises moving the fourth tenant node from the second shard to the first shard.

12. The method of migrating hierarchical multi-tenant storage of claim 9, wherein building the second hierarchical shard tree further comprises moving the third tenant node from the second shard to the first shard.

13. The method of migrating hierarchical multi-tenant storage of claim 9, wherein building the second hierarchical shard tree further comprises dividing physical segments of the second shard into a plurality of virtual shards and allocating the third tenant node data to at least one of the plurality of virtual shards.

14. The method of migrating hierarchical multi-tenant storage of claim 9, wherein building the second hierarchical shard tree further comprises moving the fourth tenant node from the second shard to a third shard, wherein the fourth tenant node is downstream from more than one node.

15. The method of migrating hierarchical multi-tenant storage of claim 9, wherein the data inconsistency is not full consistency.

16. The method of migrating hierarchical multi-tenant storage of claim 9, further comprising migrating hot data of the third tenant node before migrating cold data of the third tenant node.

17. A computer-readable storage medium comprising:
a first hierarchical shard tree including:
  a first shard having a first tenant node and a second tenant node, wherein the second node is downstream of the first tenant node, and
  a second shard having a third tenant node and a fourth tenant node, wherein the third tenant node is downstream of the first tenant node and the fourth tenant node is downstream of the third tenant node; and
a second hierarchical shard tree built based on the first hierarchical shard tree, wherein the second hierarchical shard tree has the third tenant node downstream of the second tenant node based on a determination that the third tenant node is to be migrated downstream of the second tenant node and that the migration of the third tenant node would cause a data inconsistency within the first hierarchical shard tree, the data inconsistency defined by first data stored on the third tenant node or the fourth tenant node before migration and second data to be reproduced from the first data, such that after migration the first data would be different than the second data, and wherein access to the third tenant node is allowed after the second hierarchical shard tree is built and all operations to migrate the third tenant node are finished.

18. The computer-readable storage medium of claim 17, wherein the second hierarchical shard tree is built further by moving the fourth tenant node within the second shard.

19. The computer-readable storage medium of claim 17, wherein the second hierarchical shard tree is built further by moving the fourth tenant node from the second shard to the first shard.

20. The computer-readable storage medium of claim 17, wherein the second hierarchical shard tree is built further by moving the fourth tenant node from the second shard to a third shard, wherein the fourth tenant node is downstream from more than one node.

\* \* \* \* \*